Sept. 12, 1950  H. GALLAY  2,521,710
PULSE TIME DEMODULATOR SYSTEM
Filed May 21, 1947  2 Sheets-Sheet 1

INVENTOR.
HARRIS GALLAY
BY Robert Harding Jr.
ATTORNEY

Sept. 12, 1950          H. GALLAY          2,521,710

PULSE TIME DEMODULATOR SYSTEM

Filed May 21, 1947          2 Sheets-Sheet 2

INVENTOR.
HARRIS GALLAY
BY Robert Harding Jr.
ATTORNEY

Patented Sept. 12, 1950

2,521,710

UNITED STATES PATENT OFFICE 2,521,710

PULSE TIME DEMODULATOR SYSTEM

Harris Gallay, Far Rockaway, N. Y., assignor to International Standard Electric Corporation, New York, N. Y., a corporation of Delaware Application May 21, 1947, Serial No. 749,519

5 Claims. (Cl. 179—15)

This invention relates to modulated wave signalling systems, and more particularly to systems of the pulse-time or pulse-position modulated type.

A principal object of the invention is to provide an improved demodulation arrangement for signalling systems of the pulse-time or pulse-position modulated type.

Another object is to provide an improved converter network for translating variable time-spaced pulses into corresponding amplitude modulated signals.

A feature of the invention relates to a novel combination of tubes and circuits for phasing a series of pulse-time modulated signal demodulation channels, and for accurately determining the sequential or multiplex operation of such channels.

Another feature relates to an improved demodulation arrangement for pulse-time modulated signals, wherein the combination of a plural grid mixer tube and a grid-controlled gaseous discharge tube are provided with a common biasing system therefor; and the received pulse-time modulated signals are gated through the mixer tube under control of said bias which is determined jointly by a predetermined adjustable static bias, by the signal pulse, and by a synchronizing saw-tooth wave derived from the usual marker pulse.

A further feature relates to the combination of a plural grid mixer tube and a grid-controlled gaseous discharge tube which are provided with mutual static and dynamic grid biasing arrangements, the biases cooperating to determine the initiation of gating of the mixer tube for the demodulation of the signals, and to determine the duration of gating corresponding to each of a plurality of multiplexed signalling channels, whereby greater flexibility of interchannel spacing and control is provided.

Another feature relates to an improved pulse-time demodulation arrangement wherein the received marker pulses or time base reference signals are converted into locked-in saw-tooth signals which are used to control the gating action of a mixer tube upon which the signal pulses proper are simultaneously impressed. The said saw-tooth signals are used to control the bias of an injection grid of said mixer tube and also to control the firing time of a grid-controlled gaseous discharge tube which in turn controls the blocking bias on said injection grid. This avoids the use of so-called slave oscillators of the sinusoidal wave type which have been commonly used heretofore in pulse-time demodulation arrangements.

A further feature relates to a pulse-time demodulation arrangement for plural channel signalling systems, wherein the phasing and channel selection is accomplished by means of a single D. C. potentiometer which in turn controls a gating tube for each channel which tube is of the plural grid mixer type, and which is also controlled by an auxiliary grid-controlled gaseous discharge tube. As a result of this combination of elements, remote control of the phasing and channel selection is considerably facilitated.

A still further feature relates to the novel organization and interconnection of electron tubes and circuits for providing an improved demodulation arrangement for pulse-time modulation signalling systems.

Figure 1:
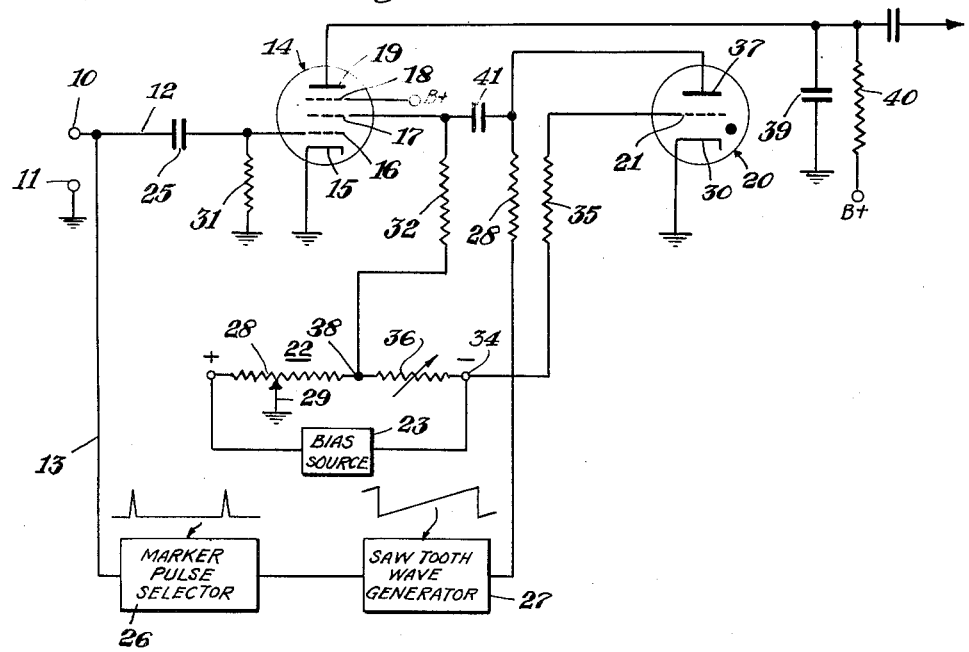
Fig. 1 is a composite schematic wiring and block diagram of a pulse-time demodulator arrangement according to the invention.

Referring to Fig. 1, the terminals 10, 11, are arranged to be supplied with a series of signal pulses such as those produced by any well-known radio transmitter of the pulse-time or pulse-position modulation type. As is well-known, such a transmitter converts the original audio frequency signals into corresponding series of sets of pulses, each set comprising for example a regularly recurrent marker pulse which acts as a time reference standard. Between each pair of regularly recurrent marker pulses are transmitted the intelligence bearing signal pulses. Usually the time period between successive marker pulses is subdivided so as to provide a number of separate multiplex channels, and the position in time of each channel pulse represents the original audio frequency signal modulation. Each signalling channel is of predetermined time duration and the channels are separated in time by a short interval known as the "guard time." For a detailed description of such an arrangement, reference may be had to French Patent No. 833,929, filed on June 18, 1937, and its patent of Addition No. 49,149, filed on July 5, 1937, and to U. S. Patent No. 2,262,838.

In accordance with the usual functioning of such pulse-time modulation systems, the received pulses are impressed upon a main signal demodulation channel 12 and upon a gating control channel 13. The channel 12, in accordance with the invention, includes a plural grid mixer or demodulator vacuum tube 14, having for example an electron-emitting cathode 15, a first control grid 16, second control or injection grid 17, a shield grid 18, and a plate or output anode 19. If desired, a secondary emission suppressor grid (not shown) may be located between the shield grid 18 and plate 19. The plate-to-cathode conductivity of tube 14 is controlled by the D. C. bias applied to the injection grid 17, and as is well-known in tubes of this type, when the signal pulses are applied to grid 16, and a saw-tooth wave simultaneously to grid 17, the pulse time modulation is converted to amplitude modulation of the pulses. A resultant audio frequency signal in the plate circuit of the tube is then produced by integrating the amplitude modulated pulses by means of capacitor 39 or other low-pass filtering means.

Figure 2:
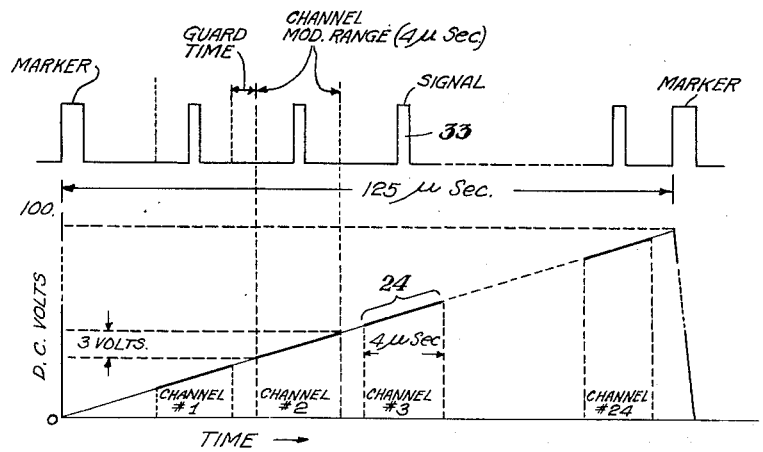
Fig. 2 shows a pair of graphs explanatory of the operation of Figs. 1 and 3.

The time of action of the demodulation and gating bias applied to grid 17 is, in accordance with the invention, controlled jointly by a saw-tooth time base wave, and by a grid-controlled gaseous discharge tube 20, such for example as a "Thyratron." The normal static bias on control grid 21 and on the injection grid 17 is derived from a potentiometer 22, which is connected across a suitable source 23 of D. C. biasing potential so as to produce the polarity as indicated in Fig. 1. The combined action of the saw-tooth bias voltage and the static bias voltage is such that the saw-tooth wave in conjunction with the received signal pulses, determines the particular point on the saw-tooth wave where tube 14 passes plate-to-cathode current; and the saw-tooth wave in conjunction with tube 20 determines the duration of such plate current flow. Thus as diagrammatically illustrated in the lower graph of Fig. 2, the saw-tooth wave which is derived from the marker pulses can be considered as divided into a series of 24 spaced segments, on the assumption that the system is arranged for 24 multiplexed channels. Each segment, such as segment 24, represents a particular signal channel, and the successive channels are separated in time by a short interval known as the "guard time." For purposes of explanation, it will be assumed that the signal channel 12 (Fig. 1) is the #3 channel represented in Fig. 2.

The received signal pulses are applied through condenser 25 in the usual way to the control grid 16, and are simultaneously applied to a marker pulse selector network 26, whereby the marker pulses are segregated from the signal pulses, in the manner described in detail for example in said French patents or in said U. S. Patent No. 2,262,838. These marker pulses are then applied to any well-known saw-tooth wave generator 27, for providing regularly recurrent saw-tooth or time base waves with the duration of each wave equal to the time interval between successive marker pulses. Thus, device 27 may be any well-known 8-kilocycle synchronized saw-tooth wave generator which is capable of producing a relatively high amplitude voltage, for example 100 D. C. volts at relatively low impedance. This saw-tooth wave voltage is applied to the injection grid 17 through a resistance 28 whose function will be described hereinbelow. The normal D. C. bias on grid 17 is determined by the setting of the grounded slider arm 29 of the potentiometer 22, it being observed that the cathodes 15 and 30 are returned directly to ground. In the well-known manner, the control grid 16 is provided with the usual grounded grid leak resistance 31.

Consequently, tube 14 will not pass plate current to its cathode until the appropriate segment 24 of the saw-tooth wave corresponding to channel 12, reaches a positive-going D. C. voltage level which is sufficient to overcome the negative bias applied to grid 17 through resistor 32. The setting of arm 29 therefore determines the point in time at which tube 14 begins to pass plate current. Also, the setting of arm 29 will determine the instant of time when tube 14 begins to act as a converter with respect to the marker signal. Conversion to amplitude modulation then commences within tube 14, the signal pulse being combined with the segment 24 of the saw-tooth wave, to give a variable amplitude in the output of tube 14, which depends upon the time relation between the signal pulse and the center of the corresponding segment 24 of the saw-tooth wave. Thus, if the signal pulse 33 (Fig. 2) occurs at the time center of its channel identifying segment 24, a certain instantaneous amplitude will be produced in the plate circuit of tube 14. If this pulse 33 occurs at the left of the center of segment 24, a lower instantaneous amplitude will be produced; while if it occurs to the right of segment 24, a still higher instantaneous amplitude will be produced. By appropriate design of the circuit constants this relation between the position of pulse 33 in time as compared with the center of the segment 24, can produce a desired linear relation between the time modulation of the pulse 33 and the resultant pulse amplitude in the plate circuit. The pulse amplitude modulation is then converted to audio frequency by integrating in the output circuit 39, 40.

To prevent interchannel crosstalk, it is necessary to prevent subsequent pulses representing other channels from being mixed with the saw-tooth wave in this particular demodulator comprising tubes 14 and 20. For this purpose, the effect of the saw-tooth wave on grid 17 is blanked out at the end of segment 24, so that under the above assumed channel spacings tube 14 is plate current conductive for only $4\mu$ seconds. The blanking is accomplished under control of gas tube 20, which has its control grid 21 normally statically biased negatively with respect to its cathode 30, by being connected to the negative end 34 of the potentiometer through series resistor 35. For this purpose, the section 36 of the potentiometer is adjustable so that the tube 20 does not fire until the end of segment 24 of the saw-tooth wave has been reached. Preferably, the plate 37 of the gas tube is connected to the saw-tooth wave generator 27, through the load resistor 28, for limiting the peak plate current drawn by tube 20. The resistors 32 and 35, and capacitor 41 act as a bias decoupling network, so that as long as the tube 20 is in a firing condition, that is so long as it is passing plate-to-cathode current, the bias at grid 17 is maintained at a value sufficient to cut off plate current through tube 14. Thus, as soon as tube 20 fires, it immediately reduces the positive bias effect of the saw-tooth wave voltage on grid 17, thereby again causing grid 17 to be biased to plate current cutoff by potentiometer section 28. Tube 20 remains in its fired condition until the saw-tooth wave voltage again drops below the firing voltage of the said tube, thus restoring the original normal bias conditions on tube 14 in readiness for the reception of the next signal pulse corresponding to channel #3.

From the foregoing, it will be seen that the setting of the arm 29 and the setting of the adjustable element of section 36, determine respectively the "on" time and the "off" time of the demodulation cycle with respect to the reference or marker pulses. In other words, the setting of arm 29 and the adjustment of resistor 36, determine which particular 4μ second segment of the saw-tooth wave shall be applied to the converter 14. For optimum converter performance using a tube, for example of the 6AS6 type, the saw-tooth amplitude should vary approximately 3 volts over the 4μ second segment, giving a linear variation of conversion conductance in tube 14 from 10 to 300 micromhos. The total saw-tooth voltage should therefore be 3(125/4)=94 volts peak-to-peak. The tube 20, may for example be a type 884 gas tube, which results in a fixed setting of the resistance 36 for any channel setting of the arm 29, since this tube has a straight line characteristic curve relating grid bias to firing potential on the anode. It should also be observed that the difference in bias potential between the points 34 and 38 is dependent only on the ratio of $R_2$ to $R_1+R_2$, where $R_1$ is the resistance of section 28, and $R_2$ is the adjusted resistance 36, so that this bias is independent of the positioning of arm 29.

Figure 3:
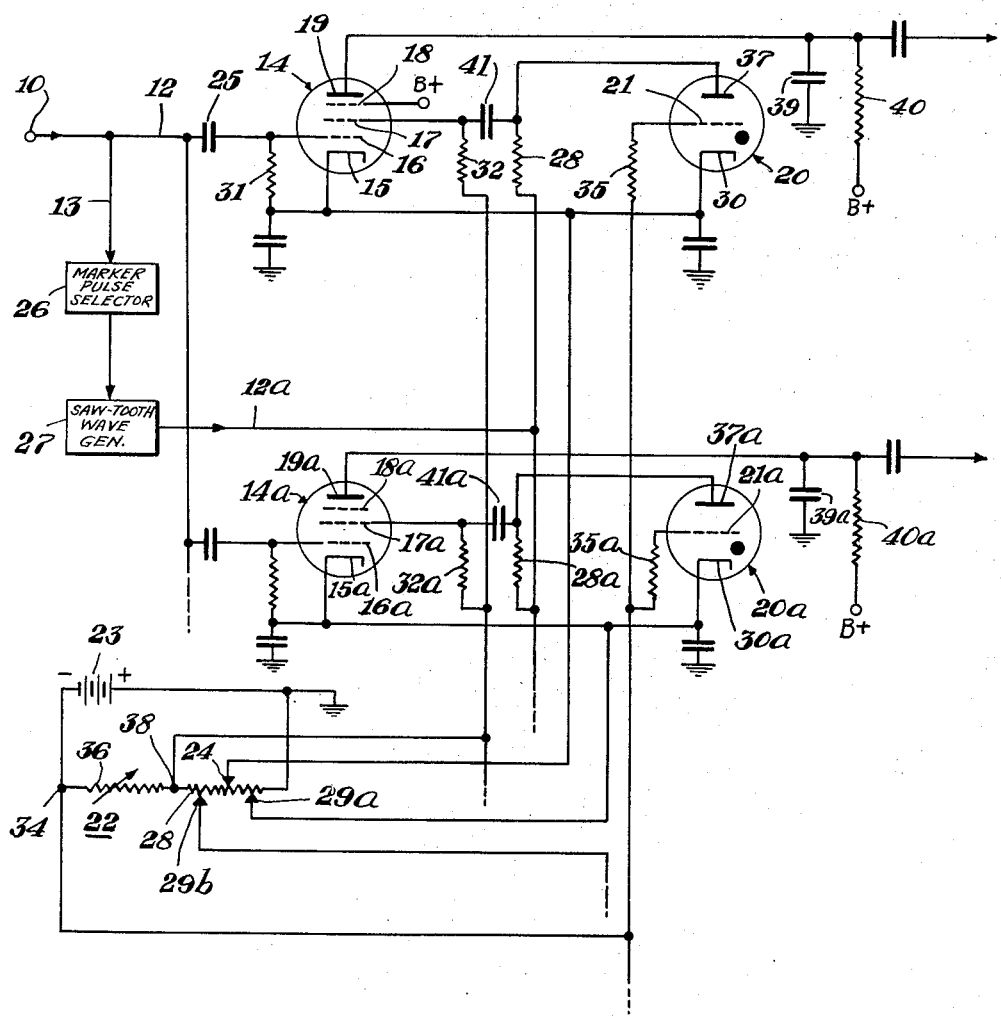
Fig. 3 is a modification of Fig. 1.

While Fig. 1 shows the invention embodied in a single channel demodulator it will be understood that the invention is particularly useful in plural or multiplexed channel arrangements and has the advantage that the single bias source 23 and its associated potentiometer 22 can be used in common to all the channels. The section 28 of this potentiometer can then be provided with a plurality of individually adjustable slider arms 29, 29a, 29b, etc. Such an arrangement is illustrated in Fig. 3, wherein two of the twenty-four multiplexed channels are illustrated. In Fig. 3, the elements of the first channel which are identical with the corresponding elements of Fig. 1, bear the same designation numerals and similarly the corresponding elements of the second channel have the same designation numerals but with the postscript "a."

From Fig. 3, it will be seen that the marker pulse selector 26, the saw-tooth wave generator 27, and the bias control potentiometer 22, are common to all the channels. However, the section 28 of the bias control potentiometer is provided with a series of independently adjustable slider arms 29, 29a, 29b, etc., each of which leads respectively to the cathodes 15 and 20 of the associated channel. The arms 29, 29a, 29b, are adjusted so as to select the corresponding appropriate segments of the saw-tooth wave in the manner above described in connection with segment 24. One of the advantages of this arrangement is that the arms 29, 29a, 29b, can be remotely controlled so as to determine from a central point, for example a local telephone office, over existing telephone lines or the like, the settings of the said arms, and therefore determining the phasing and channel selection for the multiplex transmission. Such an arrangement is therefore particularly useful at a repeater station where the in-branching and out-branching can be selected and phased by remote control of the arms 29, 29a, 29b, etc.

While certain particular embodiments have been disclosed herein, it will be understood that various changes and modifications may be made therein without departing from the spirit and scope of the invention.

What is claimed is:

1. A demodulation arrangement for signalling systems of the pulse-time modulation type including marker pulses, comprising a source of received pulse time modulated signals including marker pulses, a grid-controlled demodulator tube for the received signals, means to render said tube plate current conductive only for a predetermined segment of the total time period between successive marker pulses of the received signals, said means comprising a source of saw-tooth voltage controlled by the marker pulses and a circuit connected between said source and said tube to apply a gradually increasing positive bias to a plate current cutoff grid of said tube, means to terminate said plate current conductivity at the end of said time segment, the last-mentioned means including a grid-controlled gaseous discharge tube whose firing voltage is derived from said saw-tooth voltage, connections for said gaseous tube connecting said gaseous tube in shunt across said circuit to short circuit said circuit, and halt conduction of said demodulator tube upon firing of said gaseous tube, and means for applying a bias to said gaseous tube to block conduction thereof until the increasing bias in said circuit reaches a predetermined value.

2. A demodulation arrangement for pulse-time modulation systems, comprising a source of received pulse time modulated signals including marker pulses, a demodulator tube of the plural grid vacuum type tube, means to impress received pulse-time modulation signals on a control grid of said tube, means to derive from the marker pulses of the received signals a saw-tooth positive D. C. voltage, a D. C. potentiometer, means connecting a plate current cutoff grid of said tube to a point on said potentiometer so as normally to bias the demodulator tube to plate current cutoff, means to apply said saw-tooth voltage to said cutoff grid to initiate the plate current conductivity of said demodulator tube and for maintaining it conductive for a predetermined but limited time period which includes the time period of the signal pulse, and means to terminate said conductivity at the end of said time period, the last-mentioned means including a grid-controlled gaseous tube arranged in shunt between the cut-off grid and cathode of the demodulator tube and which derives its plate voltage from said saw-tooth voltage and which has its control grid normally negatively biased by a connection to said potentiometer.

3. A demodulation arrangement according to claim 2, in which said potentiometer comprises a first resistor section and a second resistor section connected in series, the first section being a fixed resistance and the second section being of adjustable resistance, a potentiometer slider arm contacting the first resistor section and returned to the cathodes of both of said tubes, a connection from one end of said second resistor section to said plate current cutoff grid, and a connection from the other end of said second resistor section to the control grid of said gaseous tube, said slider arm being adjustable to determine the initiation of plate current conduction of said demodulator tube, and said second section being adjustable to determine the time of firing of said gaseous discharge tube and thereby to control the termination of the plate current conductivity of said demodulator tube.

4. A multichannel pulse distributor arrangement in a system providing synchronizing pulses comprising a source of multi-channel pulse signals including synchronizing pulses, a plurality of channels each including a grid-controlled channel control tube having a cathode, and an associated grid-controlled gaseous discharge tube, a source of sawtooth waves electrically synchronized with the synchronizing pulses of the received signals, a circuit for applying said sawtooth waves to a control grid of the control tubes of each channel, means biasing successive ones of said control tubes to successively different levels so that they begin to conduct at successive intervals, connections for coupling each gaseous tube in shunt between said control grid and the cathode of its associated control tube, means for biasing successive ones of said gaseous tubes to successively different levels so that they begin to conduct at successive intervals and successively cut-off their associated channel control tubes, and means for applying the received signal pulses in parallel to a control grid of each channel control tube.

5. A multichannel pulse distributor arrangement according to claim 4 wherein each of said control tubes has a separate output circuit each including an integrating network.

HARRIS GALLAY.

REFERENCES CITED

The following references are of record in the file of this patent:

UNITED STATES PATENTS

| Number | Name | Date |
|---|---|---|
| 2,282,046 | Goldsmith | May 5, 1942 |
| 2,391,776 | Fredendall | Dec. 25, 1945 |
| 2,403,210 | Butement | July 2, 1946 |
| 2,427,523 | Dolberg et al. | Sept. 16, 1947 |